(12) United States Patent
Turner

(10) Patent No.: US 8,388,002 B1
(45) Date of Patent: *Mar. 5, 2013

(54) SELF-LEVELING AIR SPRING SUSPENSION SYSTEM

(76) Inventor: Roy A. Turner, Victorville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/220,490

(22) Filed: Aug. 29, 2011

Related U.S. Application Data

(63) Continuation of application No. 12/367,408, filed on Feb. 6, 2009, now Pat. No. 8,006,988.

(60) Provisional application No. 61/026,702, filed on Feb. 6, 2008.

(51) Int. Cl.
*B60G 11/26* (2006.01)

(52) U.S. Cl. ....... 280/124.157; 280/5.507; 280/124.106; 280/124.161; 701/37

(58) Field of Classification Search ............... 280/5.507, 280/124.106, 124.157, 124.159, 124.16, 280/124.161; 701/37
See application file for complete search history.

(56) References Cited

U.S. PATENT DOCUMENTS

| | | | |
|---|---|---|---|
| 1,647,518 A | 11/1927 | Hawley, Jr. | |
| 3,752,497 A | 8/1973 | Enke et al. | |
| 3,894,405 A * | 7/1975 | Mielitz | 62/241 |
| 4,270,771 A | 6/1981 | Fujii | |
| 4,606,551 A | 8/1986 | Toti et al. | |
| 4,655,440 A * | 4/1987 | Eckert | 267/64.11 |
| 5,219,152 A * | 6/1993 | Derrien et al. | 267/64.15 |
| 5,219,181 A * | 6/1993 | Lund | 280/5.508 |
| 5,447,332 A | 9/1995 | Heyring | |
| 5,562,305 A * | 10/1996 | Heyring | 280/5.507 |
| 5,601,307 A | 2/1997 | Heyring et al. | |
| 5,794,966 A * | 8/1998 | MacLeod | 280/5.507 |
| 6,010,139 A * | 1/2000 | Heyring et al. | 280/124.104 |
| 6,220,613 B1 | 4/2001 | Franzini | |
| 6,270,098 B1 | 8/2001 | Heyring et al. | |
| 6,318,742 B2 * | 11/2001 | Franzini | 280/124.106 |
| 6,338,014 B2 * | 1/2002 | Heyring et al. | 701/37 |
| 6,517,094 B1 * | 2/2003 | Kincaid et al. | 280/124.106 |
| 6,519,517 B1 | 2/2003 | Heyring et al. | |
| 6,619,445 B2 * | 9/2003 | Forster | 188/315 |
| 6,761,371 B1 * | 7/2004 | Heyring et al. | 280/124.157 |
| 6,834,865 B1 | 12/2004 | Lin | |
| 6,929,271 B2 * | 8/2005 | Trotter et al. | 280/124.106 |
| 6,978,872 B2 * | 12/2005 | Turner | 188/282.8 |
| 7,150,457 B2 * | 12/2006 | Rautenbach | 280/5.507 |
| 7,240,906 B2 | 7/2007 | Klees | |
| 7,384,054 B2 * | 6/2008 | Heyring et al. | 280/124.157 |
| 7,413,064 B2 * | 8/2008 | Furuya | 188/282.1 |
| 7,740,256 B2 * | 6/2010 | Davis | 280/124.157 |

FOREIGN PATENT DOCUMENTS

WO  WO 2004/076211 A1  9/2004

OTHER PUBLICATIONS

Buzzle.com, *Air Suspension System*, www.buzzle.com/editorials/1-31-2005-65105.asp.

* cited by examiner

FOREIGN PATENT DOCUMENTS

*Primary Examiner* — Paul N Dickson
*Assistant Examiner* — Timothy Wilhelm
(74) *Attorney, Agent, or Firm* — Workman Nydegger

(57) ABSTRACT

A suspension system includes a plurality of suspension members, each suspension member including a housing having an interior surface that bounds a chamber and a piston slidably disposed within the chamber. The piston seals against the interior surface of the housing so as to separate the chamber into a first compartment and a second compartment, the first compartment and second compartment being filled with a gas. A first gas lines extends in fluid communication between the first compartment of a first suspension member and the second compartment of a second suspension member. A second gas lines extends in fluid communication between the second compartment of a first suspension member and the first compartment of a second suspension member.

5 Claims, 2 Drawing Sheets

SELF-LEVELING AIR SPRING SUSPENSION SYSTEM

CROSS-REFERENCE TO RELATED APPLICATIONS

This application is a continuation of U.S. application Ser. No. 12/367,408, filed Feb. 6, 2009, which claims priority to U.S. Provisional Patent Application Ser. No. 61/026,702, filed Feb. 6, 2008, which is incorporated herein by specific reference.

BACKGROUND OF THE INVENTION

The Field of the Invention

The present invention relates to self-leveling air springs for use in a suspension system.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE PREFERRED EMBODIMENTS

Figure 1:
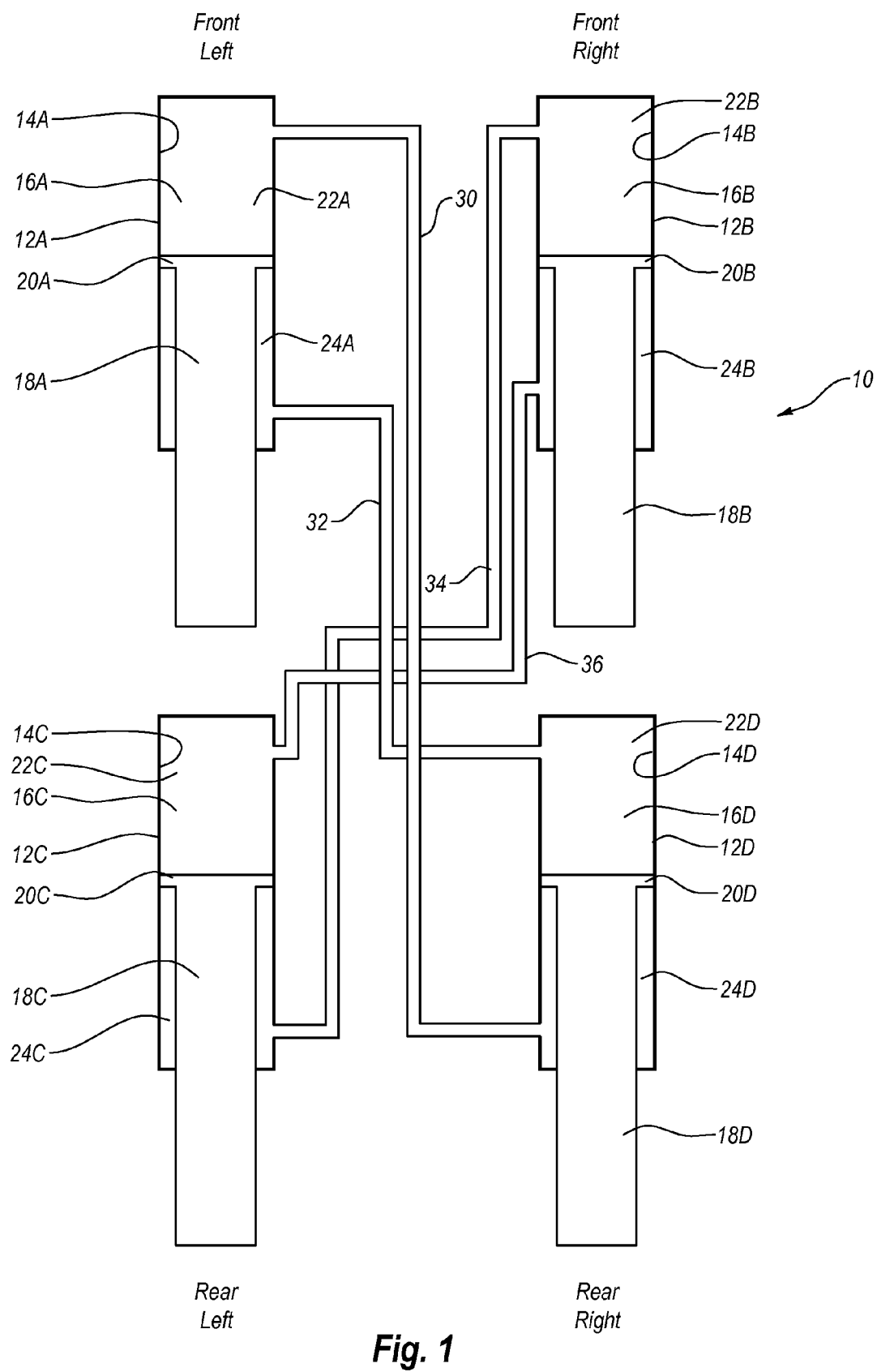
FIG. 1 is a cross sectional side view of a first embodiment of a self-leveling, air spring, suspension system incorporating features of the present invention.

The present invention relates to self-leveling, air spring, suspension systems. The suspension systems can be used on any multi-wheeled vehicle such as a car, truck, ATV, trailer, or the like. Depicted in FIG. 1 is one embodiment of a suspension system 10 incorporating features of the present invention. Suspension system 10 comprises four housings 12A-D that are connected with the axles of a vehicle each at a corresponding location adjacent to the four tires of the vehicle. The housings 12A-D can be connected to the axles in substantially the same fashion as shock absorbers are connected and can be mounted adjacent thereto. With the incorporation of a damper in each of housings 12A-D, housings 12A-D can be used to replace the shock absorbers and spring of each shock absorber or each wheel of the vehicle. In the illustrated embodiment, housing 12A is disposed adjacent to front left tire of the vehicle, housing 12B is disposed adjacent to front right tire of the vehicle, housing 12C is disposed adjacent to rear left tire of the vehicle, and housing 12D is disposed adjacent to rear right tire of the vehicle.

Each housing 12A-D has substantially the same configuration. As such, the same reference characters will be used to identify like elements between the different housings 12A-D. However, to differentiate between components of different housings, the reference characters for each of the components of housings 12A-D will be followed by the letter A-D, respectively. That is, all of the like components of housing 12A will be followed by an A while all of the like components of housing 12B will be follows by a B.

Housing 12A has an interior surface 14A that bounds a chamber 16A. A piston 18A is slidably positioned within housing 12A and has a piston head 20A that seals against interior surface 14A. Piston head 20A has a proximal face 70A and an opposing distal end face 72A. Piston head 20A separates chamber 16A into a first compartment 22A and a second compartment 24A that are sealed from each other. As shown in FIG. 1, distal end face 72A partially bounds first compartment 22A and proximal face 70A partially bounds second compartment 24A. Each of compartments 22A and 24A are filled with a gas such as air or some other gas. Accordingly, as piston 18A is upwardly advanced within housing 12A, the volume of first compartment 22A is decreased and thus the gas therein is compressed. Simultaneously, the volume of second compartment 24A is increased. As discussed above, housings 12B-D have substantially the same configuration as housing 12A and thus like elements are identified by like reference characters.

In the depicted embodiment, first compartment 22A of housing 12A is coupled with second compartment 24D of housing 12D by an air line 30 while second compartment 24A of housing 12A is coupled with first compartment 22D of housing 12D by an air line 32. Air lines 34 and 36 make corresponding connections between the compartments of housing 12B and 12C.

As discussed above, suspension system 10 is used for self leveling of a vehicle during operation of the vehicle. For example, when a conventional automobile makes a hard left turn, the shock absorbers on the front and rear right side are compressed while the shock absorbers on the front and rear left side are extended, thereby giving a tilt to the automobile. When the present invention is used on the automobile, as the automobile makes a hard left turn, pistons 18B and 18D are again driven upwardly into first compartments 22B and 22D, respectively, so as to lower the right side of the automobile. Simultaneously, however, as pistons 18B and 18D are driven into first compartments 22B and 22D, the gas therein is compressed and driven into second compartments 24C and 24A of housings 12A and 12C on the left side of the automobile. As a result of the gas pressure in compartments 24C and 24A increasing, the gas pressure drives pistons 18C and 18A upward, thereby also lowering the left side of the vehicle.

Accordingly, the present system helps to automatically level the vehicle by having one side of the vehicle mimic the elevation or movement of the other side of the vehicle. Furthermore, by having the various chambers filled with a gas, as opposed to a hydraulic fluid, the gas compresses and expands so as to form a resilient spring that helps to more smoothly control the movement of the vehicle. In alternative embodiments, it is appreciated that the air lines between the different compartments can be positioned in a variety of different arrangements. For example, in contrast to having housing at opposing corners of the vehicle coupled together, the housings can be coupled together side to side or front to back. For example, compartment 22A can be coupled to compartment 24B while compartment 24A is coupled with compartment 22B. Likewise, compartment 22A can be coupled to compartment 24C while compartment 24A is coupled with compartment 22C. Other combinations can also be made.

Figure 2:
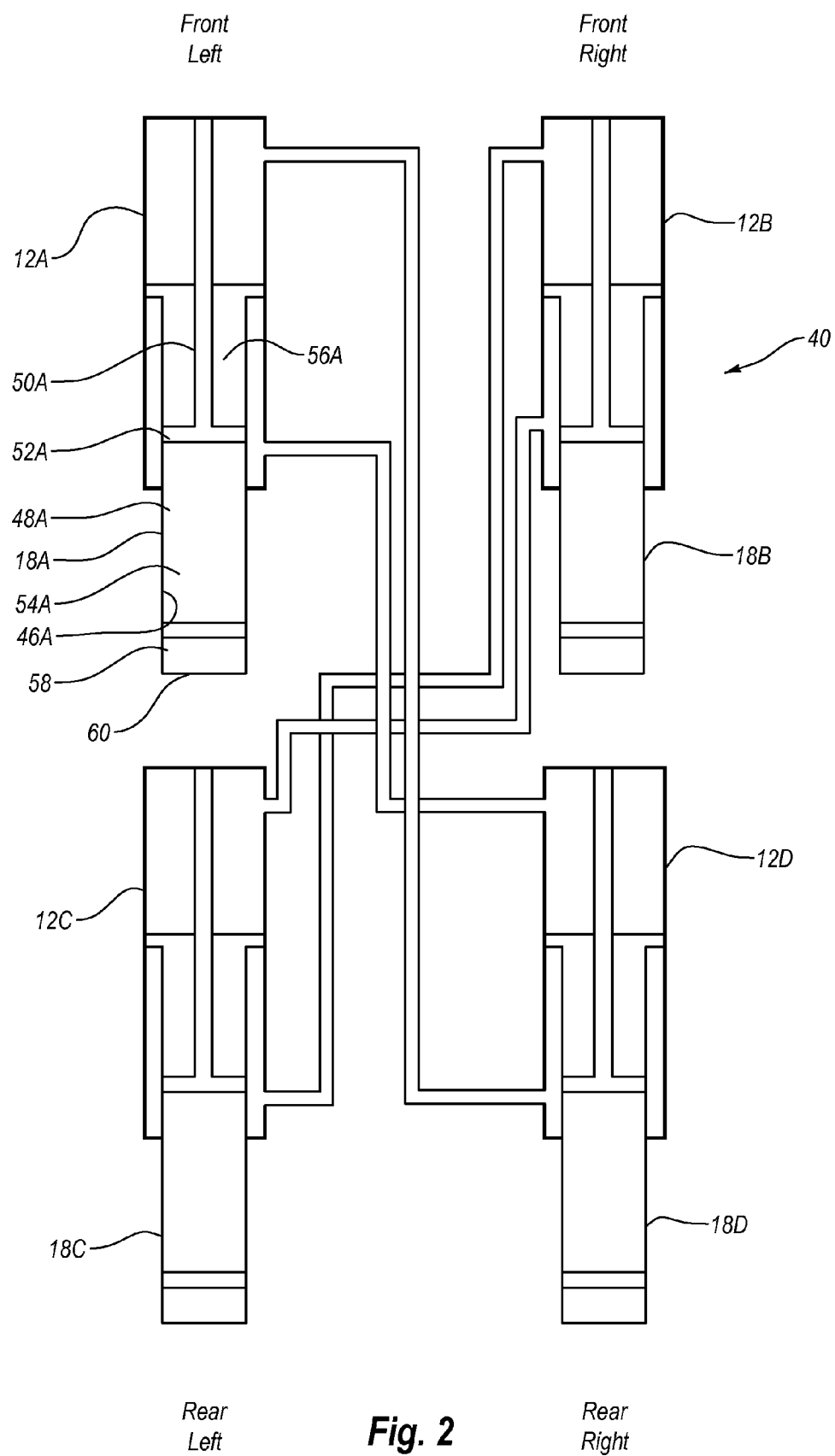
FIG. 2 is a cross sectional side view of a second embodiment of a self-leveling, air spring, suspension system incorporating dampers.

Depicted in FIG. 2 is a suspension system 40 wherein a damper has been incorporated into each housing 12A-D. Suspension system 40 is substantially the same as suspension system 10 except that each piston 18A-D bounds a damping chamber in which a secondary piston is received. For example, piston 18A has an interior surface 46A that bounds a damping chamber 48A. Damping chamber 48A is filled with a hydraulic fluid. A secondary piston 50A is slidably positioned within damping chamber 48A. Secondary piston 50A has a piston head 52A that divides damping chamber into a first compartment 54A and a second compartment 56A.

Piston head 52A has a distal face 80A and an opposing proximal end face 82A. As shown in FIG. 2, distal face 80A partially bounds second compartment 56A and proximal end face 82A partially bounds first compartment 54A. Piston head 52A can use any type of valve to control the hydraulic fluid that passes therethrough piston head 52A, as secondary piston 50A is moved within damping chamber 48A. Alternative examples of piston 50A with control valve that can move within a damping chamber to facilitate suspension damping are disclosed in U.S. Pat. No. 6,978,872 which is incorporated herein by specific reference. A movable floating piston 58A is also disposed within damping chamber 48A and partially bounds a gas filled compartment 60A which is also discussed in the '872 patent.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A suspension system comprising:
    a first suspension member comprising:
        a first housing having an interior surface that bounds a first chamber; and
        a first piston slidably disposed within the first chamber, the first piston having a first piston head that seals against the interior surface of the first housing, the first piston head having a proximal face and an opposing distal end face, the first piston separating the first chamber into a first compartment and a second compartment such that the distal end face of the first piston head partially bounds the first compartment and the proximal face of the first piston head partially bounds the second compartment, the first compartment and the second compartment being filled with a gas;
    a second suspension member comprising:
        a second housing having an interior surface that bounds a second chamber; and
        a second piston slidably disposed within the second chamber, the second piston having a second piston head that seals against the interior surface of the second housing, the second piston head having a proximal face and an opposing distal end face, the second piston separating the second chamber into a first compartment and a second compartment such that the distal face of the second piston head partially bounds the first compartment and the proximal face of the second piston head partially bounds the second compartment, the first compartment and the second compartment being filled with a gas;
        a first gas line extending in fluid communication between the first compartment of the first housing and the second compartment of the second housing; and
        a second gas line extending in fluid communication between the second compartment of the first housing and the first compartment of the second housing.

2. The system as recited in claim 1, further comprising a damper disposed within the first chamber of the first housing and interacting with a hydraulic fluid, the hydraulic fluid being sealed off from the gas.

3. The system as recited in claim 1, wherein the proximal face and the opposing distal end face of the first piston head are fixed relative to each other when the first piston slides within the first chamber.

4. The system as recited in claim 1, wherein the first and second pistons are the only pistons slidably disposed within the first and second chambers.

5. The system as recited in claim 1, wherein no springs are disposed within the first and second chambers.

\* \* \* \* \*